Patented May 19, 1936

2,041,197

UNITED STATES PATENT OFFICE 2,041,197

METHOD OF INDUCING CRYSTALLIZATION

Albert Adams Lund, Port Washington, N. Y., assignor to California Fruit Growers Exchange, Los Angeles, Calif., a corporation of California No Drawing. Application July 11, 1932, Serial No. 622,011

20 Claims. (Cl. 99—134)

This invention relates to the art of inducing crystallization, and it has particular applicability, according to my present understanding, to those uses in which it is desired to induce or hasten the inception and/or the rate of crystallization of sugars in solution, or in supersaturated solution, or where it is desired to increase the ability of a sugar to crystallize. The invention is also of utility in assisting in influencing the nature and/or type of the crystallization.

Obviously, one of the several important fields for the utilization of sugars, and a field in which the crystallization of sugars is of importance, is the confectionery art. It is in its connection with this art that I will set forth in detail the distinctive features of my invention and explain its particular modes of operation, although I am aware and desire it to be understood that it has a definite applicability to other fields.

In the confectionery art it is sometimes desirable to repress or delay or entirely to prevent crystallization. It is sometimes advantageous to bring about or hasten the beginning of crystallization. It is, moreover, sometimes desirable to accelerate the speed of crystallization. A third definite desideratum may be to influence and/or alter the nature or type of the crystallization.

Many phenomena relating to the crystallization of sugars as used in the confectionery art and elsewhere are well known and rather thoroughly understood. It is not new to cause the starting of crystallization and, furthermore, it is not new to bring influencing factors to bear upon the nature of the crystal structure formed.

I have discovered, however, that it is possible, by the addition of small amounts of certain materials to the confectionery material in handling, as well as in the handling of sugar-containing materials in other relationships, to bring about or hasten the beginning of crystallization, to cause crystallization to occur in some instances where it otherwise would not, to accelerate the crystallizing process, and to influence and/or alter the type of crystal structure formed. In general, these materials which I add seem to be capable of being rather accurately classified together as edible, gum-like hydrophilic colloids. Among the materials which I may employ may be mentioned Indian gum, gelatin, pectin, agar, locust kernel gum, egg albumen, gum tragacanth, Irish moss, cornstarch, gelatinized starch, sodium caseinate and soluble alkali salts of alginic acid, psyllium seed and gum arabic. It is particularly to be noted that although all of these materials are found to have a reasonable degree of utility in this particular relationship, they are not on that account to be regarded as equivalents in any general or all-inclusive sense since many marked differences of characteristics and properties exist throughout the whole group. Even in this particular relationship there are some rather wide variations in effectiveness.

Of the materials enumerated, gelatin, pectin, Indian gum (also known as gum karaya) and agar seem to be more effective for the particular purposes, and are preferred.

It should be pointed out that the particular effect that I regard as being most desirable to be secured in influencing and/or altering the nature and/or type of the crystal structure formed is to secure a very fine-grained, smooth crystal structure, one which may be described as soft without being weak, firm without being hard, readily plastic and yet definitely form-retaining.

Accordingly an object of my invention is to provide and disclose methods and means for inducing the inception of crystallization and sugars.

A further object of my invention is to provide and disclose methods and means for hastening the rate of crystallization of sugars.

Another object of my invention is to provide and disclose methods and means for influencing and/or altering the nature and/or type of crystal structures formed by the crystallization of sugars.

Another and further object of my invention comprises the use of gum-like hydrophilic colloids, especially pectin, agar, gelatin and Indian gum in the manufacture of fondants and analogous confectionery materials for the purpose of effecting economies of time and operations, enabling the use of mixtures not otherwise as useful, and improving the final article.

It is one of the objects of my invention to bring the preparation of dextrose fondants and other grained confections within the time limits of commercial practice.

It is a further object of this invention to permit the use, in fondants grained in the sucrose phase, of quantities of low-priced corn syrup solids (including refined dextrose) substantially greater than can be used at the present time without impairing the quality of the product or making it impossible to cream within the limits of commercial practice.

A further object of the invention (to the extent that it relates to low-viscosity crystallizing magmas such as dextrose syrups) is to increase the viscosity of the syrup to a point which will enable it to be handled on continuous beaters (creaming machines) of the screw or propeller type. The viscosities of dextrose solutions are relatively low. The commercial machines which are now available for this work were designed for sucrose solutions. The barrels are not long enough to give the blades a chance to "take hold" of the syrup and perform the creaming operation before the thin syrup has progressed through the barrel to the outlet gate. The "binding" of moisture by the colloid produces an initial viscosity effect of itself; this is further increased by the rapid deposition of crystals which the presence of the colloid induces. The combined effect is sufficient to raise the viscosity to a point where it is possible to handle on a "screw type" beater dextrose solutions which it has not previously been possible to cream satisfactorily on these beaters, or in any continuous manner. The utility of this is apparent, and novelty resides in the fact that, whereas larger amounts of colloid might have been used to produce the required viscosity, the use of a colloid in such proportions would have entailed such an excessive lengthening of the creaming time as to make it impracticable from a commercial standpoint, if not impossible. My method obviates the need for special equipment to cream dextrose fondants by continuous process, without increasing the creaming time but, instead, lowering it quite measurably.

A further object of the invention is to reduce the making of stock dextrose fondants from a two-stage to a one-stage process by making it possible to cream, within commercially practicable limits of time, mixtures of dextrose and other sugars in which dextrose is the dominant phase, and doing away with the usual addition of the diluent or syrup batch at the end of the creaming process.

A further object is to produce a handroll cream of substantially reduced sweetness by graining in the dextrose phase with the help of a proper colloid.

A further object is to produce within the time limits of commercial practice a casting cream containing an unusually high percentage of corn syrup solids, and possessing many of the desirable characteristics of the more expensive handroll creams.

A further object is to produce a fondant with unusual properties of plasticity, these properties apparently resulting chiefly from the reduction of friction at the interface and from the general elasticity of hydrated colloidal sols.

Further objects of the invention are to increase or to restore the crystallizing effectiveness of crystal and spent-crystal syrups; to accelerate the deposition of crystal coatings on candy, nut and fruit centers, etc., and to facilitate producing a smooth, uniform coating of extremely fine crystals on the centers.

Other objects, as well as the advantages, will be in part obvious, will in part be pointed out hereinafter, and in part will appear from a contemplation of the invention as set forth herein and in the appended claims. In this connection, it should be particularly pointed out that my invention makes possible the ready and satisfactory use of pure commercial dextrose in large quantities in goods of the character herein referred to, whereas this is otherwise difficult to do in a satisfactory manner, and it is at best a decidedly time-consuming undertaking. Other particular advantages will more fully appear hereinafter.

The field covered by the confectionery industry is very loosely defined. Bakers, for example, perform the functions of confectioners when they make grained icings, butter-creams, etc.

The process has potential application in the refining industries for restoring "weak" sugars and syrups to prime crystallizing strength; the preparation of special crystallizing sugars and syrups; the graining of commercial invert, etc.; in the preparation of so-called "amorphus" sugars. Applications are also indicated in glace fruit manufacture; preparing creamed honey, maple butter, etc.

I have examined the applications of my invention in connection with the use of several hydrophilic colloids, particularly pectin, and accordingly examples will be given illustrating the use of pectin in this relationship. It is, of course, not to be understood that I intend to limit myself to this specific material, since these illustrations are exemplary only, and are given for the purpose of illustrating a preferred form of the invention. Some changes, variations and substitutions will be suggested hereinafter. Some additional ones will be obvious, others will readily suggest themselves to those skilled in the art, while still others will appear from a contemplation of the invention. All such changes and variations as fall within the scope of the appended claims are intended to be included.

It is, of course, to be understood that the word "fondant" is properly viewed both as a specific term and as a generic term, and that in its generic aspects I regard it as including a variety of more or less related products, namely: stock fondants, casting creams, handroll creams, grained invert sugar, bonbon coatings, fudges, grained icings, bakers' butter-cream, maple butter and maple cream, creamed honey, etc. It is my intention to express the generic aspects by the general term "fondants" and to express the more specific aspects by the more definite term "fondant".

One of the important applications of my invention is to the making of fondants crystallized in the dextrose phase. The use in these of small quantities of, for example, pectin causes the initial appearance of graining to occur almost immediately, and reduces the total creaming time as much as approximately 60%. With Indian gum in grained confections I have produced as much as about 65% reduction in creaming time, and with gelatin as much as about 60% reduction. The proportionate amount of reduction in total creaming time will vary some from colloid to colloid, and also with the proportin thereof employed, which is usually relatively very small.

In general, in the preparation of dextrose fondants, the dextrose can not, with hope of satisfactory results, be cooked, as may be done with sucrose fondants, together with corn syrup or invert sugar. Instead, these ingredients, previously cooked to the required density must be added in the beater after the dextrose crystals have been formed. This means that in the making of a stock dextrose fondant, for example, two batches instead of one must be prepared. The addition of these sugars earlier in the process delays crystallization tremendously.

The reluctance of dextrose to crystallize may, as is known in the art, be further overcome by generous "seeding" either with finely powdered dextrose or, better still, with a portion of a previous batch. The seed is added after the syrup has cooled in the beater and immediately before beating. A pound of seed to a hundred of batch is ordinarily sufficient. The seeding is facilitated if the fondant is dispersed in an approximately equal quantity of the cooled syrup (taken from the creaming batch) before it is introduced into the creaming batch. Freshly-made fondant is very much more effective as seed than fondant aged even as little as 24 to 48 hours, presumably because it contains a greater number of crystal foci.

The heat of crystallization of dextrose is much greater than that of, say, sucrose, as is well known, and on that account the comparatively large amounts of heat generated during the crystallization of a dextrose batch, with the consequent relatively high temperature, are also a factor in slowing up the creaming process, comparatively, unless the precaution is taken to cool the syrup just as low as possible before beating is begun. One reason for using low temperatures is to prevent the dextrose crystal from re-dissolving (which it will do if the temperature is allowed to go much above 110° F. At 122° F. (50° C.) the anhydrous form becomes the stable phase). Also, as the temperature rises, the solubility of dextrose increases approximately four times as fast as sucrose. This means that the degree of supersaturation (and hence susceptibility to crystallization) is decreased at a very great rate with comparatively slight increases in temperature. It is for this reason that comparatively low temperatures are essential to the satisfactory commercial creaming of dextrose-phase fondants.

Because of its lower solubility and the fact that in crystallizing it tends to remove moisture from the batch to provide for its crystal water requirements, any fondant in which dextrose is used to form the solid phase must be cooked to a substantially lower point on the temperature scale than is customary with sucrose fondants. The usual range for sucrose fondants is from about 238° to about 244° F. The usual range for dextrose fondants is from about 228° to about 234° F. Each limit of these temperature ranges (and others hereinafter stated) may be extended 2° F. But, if the temperature of cook is too low, the solids content of the fondant's syrup phase will not be sufficiently high and the cream will be soupy. On the other hand, fondants cooked above 246° F. are practically unworkable because there is insufficient moisture left in the cream at this point to provide a reasonable degree of plasticity and softness.

In "re-melting" a stock dextrose fondant, one must keep in mind the ease with which the dextrose crystals will re-dissolve. If the temperatures of re-melting are allowed to go much above 100° F. some of the crystals will dissolve and the texture of the fondant will be impaired.

A typical dextrose fondant, made by the double batch method, and employing pectin, might be made as follows: Weigh out the required amount of dextrose and warm about two-thirds that amount of water. Mix the desired amount of pectin with from six to ten times its weight of dextrose taken from the previously weighed portion. When the water has come up to blood heat, stir in the pectin-dextrose mixture and stir while bringing the water to boiling. A thorough solution of the pectin should thus be achieved. Add the remainder of the weighed portion of dextrose and cook to 230° F. Cool to below blood heat, preferably to about 60° F. and cream with any suitable beater. The time period involved in the cooling step may have an important function, as will be more fully pointed out hereinafter. The second or syrup batch, which is added to the creamed dextrose batch in the beater, may consist of two parts corn syrup and three parts invert sugar mixed together with a little water and cooked to 232° F. The syrup batch may comprise about 15% to 25% of the completed batch. Obviously, the proportion of the ingredients in the syrup batch may be varied, as may the temperature to which it is cooked and the proportional relationship between the syrup batch and the main batch. The syrup batch is added when the creaming of the main batch has been completed. The beating is continued for a minute or two to secure a thorough blending of the two batches. This base or "stock" fondant is then ready to be further handled in accordance with the wishes and needs of the manufacturer, which may include the addition of a subsequent syrup batch or "bob" to dilute the fondant for casting, together with the addition of color, flavor and egg albumen, gelatin, marshmallow nougat cream or other "frappe" to lighten the final color and consistency of the cream.

In the above-described as well as in the hereinafter described cooking steps, it should be remembered that while the cooking time is not critical, any undue lengthening of the cooking time which might result in a caramelization or breakdown of the sugars should be avoided, as the introduction of the caramelization impurities would affect the crystallization rate and impair the product.

When preferred, the pectin may be mixed with the entire amount of the dextrose and this mixture then added to the aqueous medium.

In many uses, instead of using the syrup batch or "bob" described above, it will be desirable to use one whose composition will be limited to corn syrup and/or sucrose. The choice of solids for the syrup batches determines the final texture and consistency of the cream. Both corn syrup and invert sugar contain dextrose and when either of these sugars is added in the syrup batch, the effect is to increase the total amount of dextrose in the combined batch available for crystallization. When the syrup is added mainly comprising sucrose, the entire syrup batch remains in the syrup phase, thus increasing the effective proportion of diluent and preventing excessive hardening of the fondant.

I wish to point out at this juncture that when pectin is used in accordance with my process the seeding step may be omitted, although it does aid in further reducing the creaming time. However, it is not essential to employ seeding to hasten the inception of crystallization when pectin or other suitable colloid is used. In the single batch type of dextrose fondant, which is described later, the use of both seed and colloid-accelerator are advisable, to bring the creaming time within the limits of commercial practice. As much as 5% of freshly-made fondant seed, together with adequate cooling and the optimum use of the colloid have been found to produce really satisfactory results.

The pectin as used in the above batch may be present in any desired and effective proportion. It should be noted here that when a relatively large proportion of pectin or other colloid is used, in the manner previously known in this art, a definitely opposite effect is obtained. A powerful inhibition of crystallization is set up. In general, for my purposes, I find that pectin is effective over a range of from about 0.01% to about 2.0%, as dry pectin. I prefer, however, to employ from about 0.05% to about 1.0%, based on the weight of the solids of the batch. In combination-batch fondants, such as illustrated above, I find about 0.35% of pectin to give optimum results.

In making fondants grained in the dextrose phase, in accordance with my invention, it is not necessary to resort to the double batch method, as previously described. For example, it is possible to make a so-called "handroll" cream suitable for hand or machine moulding, which comprises about 80% dextrose and about 20% sucrose cooked together to about 230° F. seeded with fondant and creamed. During cooking, a part of the sucrose will be converted to invert sugar. Such a batch will preferably contain about 0.4–1.0% pectin, on the basis of the solids. Unlike dextrose fondants prepared in the ordinary manner, it remains in a plastic condition suitable for moulding by hand or machine. It is "short" in texture and extremely smooth and silky in the mouth. It is not too intensely sweet, a characteristic which has retarded consumption of handrolls grained in the sucrose phase. The use of the secondary or syrup batch is eliminated and the lardy or "cold cream" character which detracts from the eating quality of ordinary dextrose fondants is done away with. Moreover, by the use of pectin, a ready crystallization is brought about and a very considerable improvement of the texture is effected. This texture and consistency are apparently not obtainable when the ordinary procedure is followed. A small proportion of gelatin, egg albumen, "nougat cream" or "frappe", together with the desired color and flavor, are usually added to the batch toward the completion of the creaming. The purpose of the frappe is to further lighten the texture and increase the solubility of the cream in the mouth. The latter is not new but is an accepted part of the process of making handrolls. It is also used to some extent in cast goods to lighten the color, by whipping in air, and to vary the texture.

The proportion of sucrose used in this fondant may be varied between, say, 15% and 30% according to the consistency desired in the finished cream. Also, the cook may be reduced slightly to permit of a larger percentage of moisture and corresponding degree of softness in the finished cream. The stock fondant described here may be diluted with a "bob" or thinning down syrup in the manner previously described and used for casting. All proportions of dextrose from 100% down to possibly 65% or 70% can be handled as described in these two methods, by varying the pectin concentrations as required. Corn syrup and/or invert may be introduced.

Under certain conditions, it may be necessary to use rather more pectin in this type of goods (i. e. where the sucrose or non-dextrose substance is cooked together with the dextrose), to produce sufficient acceleration of creaming time than where the dextrose is cooked alone.

It should be understood that whenever I have used the word "dextrose" alone to describe that ingredient, I prefer to be understood to mean "refined dextrose". Dextrose containing more than a minimum of impurities will not work so satisfactorily. There are such sugars on the market.

With regard to the character of the improvement in the texture of these fondants, the following is a summary of the benefits my new process achieves: improved solubility in the mouth, with resulting enhancement of flavor; improved shortness of "break" (reduced gumminess); a more desirable smoothness and silkiness of texture; a continued condition of plasticity which has not heretofore been possible in dextrose fondants and which would be equally striking if encountered in a sucrose fondant, which it is not. This continued plasticity can, if desired, be employed to dispense with the necessity for "kneading" and/or remelting prior to moulding into centers by hand or machine.

One of the things which this art has heretofore sought has been a casting cream which would approximate the highly prized texture of a good handroll cream, but which could be produced within or near the range of casting cream costs. I have discovered that this highly desirable result can be achieved by means of my invention. Such a cream, exemplary proportions being given, would consist of 63 parts sucrose, 12 parts "high purity" corn syrup, and 25 parts dextrose and would contain, on the basis of solids, preferably about 0.05 to 0.2 pectin, by weight. From 65 sucrose, 10 corn syrup and 25 dextrose, to 90 sucrose, 10 corn syrup and 0 dextrose, and, taking in the complete range of "doctored" sucrose fondants, these proportions may be varied to suit the desires of the manufacturer. Combinations of sucrose and invert in various proportions, with or without corn syrup, may be used. The method permits the use of prepared cane and invert sugar syrups in proportions not ordinarily crystallizable. The handroll consistency is principally characteristic of the formulas containing the higher amounts of dextrose, which, by reason of its low viscosity, shortens the texture and counteracts the toughening tendency of the corn syrup. Cooking temperature should ordinarily be about 240° F. to 244° F. I prefer, in addition to using the pectin, to seed the batch in the known way. Unless proper precautions are observed in cooling, etc., it may be advisable to seed generously (as much of 5% fondant or even more being used) in order to augment the effect of the pectin and bring the creaming time well within commercial time limits. This casting cream can be produced at a relatively low cost, and will in fact have a texture approaching that of a good handroll cream. It is important to note that attempts have been made to utilize a batch having the proportions of ingredients the same as above, except for the pectin. Although such a batch will give a cream of good texture, it requires such long periods, not by any means less than one hour, to give a sufficient degree of crystallization that the time factor makes the cost of its manufacture practically prohibitive. When pectin or other suitable colloid is used, in accordance with this present invention, the initial appearance and rate of crystallization are both materially quickened, and decidedly important economies are effected, in addition to the great improvement in texture.

The speed of crystal formation induced by the hydrated colloid, in addition to resulting in a finer deposition of crystals, causes the greatest number of gaps between crystals, and, consequently, a condition of maximum volume. The crystals having once formed, there is, apparently, a check upon the subsequent growth of these crystals, owing, presumably, to surface absorption of the colloid, and to the tendency of the hydrated colloid to fill up the gaps and restrict the crystal growth by crowding. The presence of the colloid encourages the formation of the softer types of crystals, and an unusual degree of plasticity is imparted to the cream.

My invention is explained in detail above in its use with dextrose fondants, particularly. It is very important in that field because of the great economies and improvements it makes possible. It is also of very definite value in sucrose fondants. The coarse crystal deposits ordinarily resulting from insufficient "doctoring" and from "rushing" the creaming operation are definitely prevented. Softer, smoother crystal formations and increased plasticity of the finished cream are secured. The amount of pectin required in high grade sucrose fondants being materially less than that required in dextrose fondants, the manufacturer can employ this new production aid at a minimum of expense. For example, in a sucrose-phase fondant containing 10% of invert sugar, the use of 0.4% of added pectin saved 46% of the total creaming time.

The percentage values given above for pectin have reference to the use of a high quality citrus pectin of 100 grade, which may be procured on the open market. Pectin of other strength or in other form or from other sources can be used instead, the necessary adjustments of proportions, of course, being made.

The usual method of coating candy centers and similar materials with sugar crystals is to cook a straight sugar (sucrose) syrup to from 33° to 36° Baumé and suspend the centers in wire baskets in this solution, which, upon cooling, becomes supersaturated and deposits a layer of crystals on the centers. After the crystal coated centers have been removed from the syrup bath, the syrup is known as "spent" syrup, owing to the partial depletion of its sugar content resulting from the deposition of sugar on the centers. The extent of the depletion may be determined or calculated and a corresponding proportion of fresh sugar supply added to this syrup and cooked up to a point about half a degree higher than previously for the next crystal-coating operation. By the end of this second crystallization, however, the syrup contains an increased proportion of crystal inhibiting elements, such as invert resulting from the repeated cookings, a concentration of the impurities present in the original sugars, etc. It has lost its crystallizability or "strength", as the confectioner terms it. It is no longer suitable for high-class crystal work, and although some confectioners may recrystallize again and again, adding sugar and recooking, the quality of the finished product is impaired and the whole crystallizing procedure slowed up.

It has been found that, if to this spent syrup a fractional percentage of pectin, previously dissolved in water, be added and dispersed together with the additional sugar requirement to form a reconstituted crystal syrup batch, the crystal-inhibiting tendency of the accumulating impurities may be overcome and the effective life of the crystallizing syrup prolonged.

It has been determined by numerous experiments that the spontaneous precipitation of sugar from such supersaturated solutions is substantially accelerated in the presence of pectin, the curves following in the main, the curves established for the crystallization of similar solutions under agitation. The time required for the deposition of the crystals is, of course, materially longer than when the syrups are more concentrated and kept continually agitated, but, in general, I have found the same principles to apply to spontaneous crystallizations as apply to "creaming".

Of related interest is the fact that with the development of this method of accelerating the spontaneous deposition of crystals, it becomes possible to coat nut, fruit and dextrose fondant centers with a layer of dextrose crystals, as well as nut, fruit and sucrose fondant centers with sucrose crystals. This has not been commercially feasible heretofore.

It is also of interest to note that the principle of spontaneous crystallization has been successfully applied to commercial dextrose fondants by preparing the syrup with the aid of pectin in the usual manner, cooling, seeding, giving a brief mixing in a dough type or other convenient mixer (5 minutes or less) to insure distribution of the seed, and setting the mixture aside until the following morning when it will be found ready for handling in the usual way. An advantage of this method is that a slightly larger crystal size results and the finished cream is in consequence whiter (less translucent) and less lardy in character. The texture is still quite smooth and there is no objectionable graininess on the tongue.

Reference has been made hereinabove to the possible importance of the time factor involved in the cooling step. Some indications have been obtained that the colloid used for the purposes set forth herein functions more satisfactorily when it reaches a maximum degree of hydration. A certain time factor is always involved in the hydration of a hydrophilic colloid. A rest period, such as the time involved in the cooling operation, where this is done without agitation, would serve to allow time for an increase in the hydration of the colloid. I find, however, that I can obtain very satisfactory results by agitating during cooling. This tends to decrease the time required for cooling and is easily accomplished on a beater of the type having a flat creaming bed and rotary plows.

If the conditions of dispersing the pectin in the batch are such as to insure colloidal solution, further hydration is apparently not needed during the subsequent cooling period. However, there are instances where the powdered pectin must be added to an already concentrated syrup (e. g. honey), and in such cases, a period must be allowed for the pectin particles to hydrate naturally. The length of the cooling period has no significance, per se.

While I have not found that the pH of the batches of the materials with which I have worked has any highly critical importance, I have found that, for example with pectin, slightly better results are obtained on the acid side, and particularly within the range pH 2.5 to pH 4.5. All ordinary confectionery operations will lie, normally, within a satisfactory pH range, and under all such conditions the practical operator does not need to give any thought to this matter.

My invention, in its general aspects, is all the more surprising when it is remembered that certain of the gum-like hydrophilic colloids, as for example gelatin, have been known to have the ability to repress crystallization. Some of them have, indeed, found a wide commercial use for that purpose. In general, my discovery seems to indicate that smaller proportions of certain of these same materials will have, instead of the same tendency in a lesser intensity as might be expected, a definitely opposite tendency. I have not evolved any entirely and completely satisfactory theory of the principle of operation, but I do know that small quantities of the materials mentioned have the results indicated, in a wide field of application.

Having thus described my invention in such full, clear, concise, and exact terms as to enable others skilled in the art to make, use, and practice the same, I claim as my invention and desire to secure to myself by Letters Patent all changes and variations which come within the scope of the following claims.

I claim:

1. In a process for the manufacture of fondants, the steps of dispersing from about 65% to 100% dextrose and from 0% to 35% sucrose in an aqueous medium with from 0.01% to 2.0% of an edible gum-like hydrophilic colloid, cooking the dispersion to from about 226° F. to 236° F., and then cooling and creaming the dispersion.

2. In a method of preparing fondants, the steps of forming a dispersion containing sucrose corn syrup, dextrose and from about 0.05% to 2% of an edible gum-like hydrophilic colloid, cooking the mixture to a temperature of from about 226° F. to 246° F., and then cooling and creaming the same.

3. A method of manufacturing fondants of the nature of handroll creams, which comprises the steps of dispersing 70 to 85 parts of dextrose and 15 to 30 parts of sucrose and 0.01% to 2.0% of an edible gum-like hydrophilic colloid in an aqueous medium, cooking the batch to a temperature of from between 226° F. to 236° F., and then cooling and creaming the same.

4. A new and improved process for the manufacture of handroll creams, which comprises the steps of dispersing about 80 parts of dextrose and 20 parts of sucrose and about 0.4% to 1.0% of pectin in an aqueous medium, cooking the batch to about 230° F., and then cooling and creaming the batch.

5. A new and improved process for the manufacture of fondants, which comprises the steps of forming a fondant batch containing dextrose in major proportion and about 0.05% to 2.0% of pectin by weight, cooking the batch to about 226° F to 236° F., cooling the batch to below 110° F., and creaming the batch.

6. A new and improved process for the manufacture of fondants, which comprises the steps of forming a fondant batch containing dextrose in major proportion and about 0.01% to 2.0% of an edible, gum-like hydrophilic colloid by weight, cooking the batch to about 226° F. to 236° F., cooling the batch to below 110° F., and creaming the batch.

7. A new and improved process for the manufacture of fondants, which comprises the steps of forming a fondant batch containing dextrose in major proportion and about 0.05% to 1.0% of an edible gum-like hydrophilic colloid by weight, cooking the batch to about 230° F., and cooling the batch to below 110° F. to permit crystallization to take place.

8. The improvement in the manufacture of fondants grained in the dextrose phase, which comprises the addition of edible gum-like hydrophilic colloids to the fondant batch for the purpose of hastening the beginning of crystallization in the batch and shortening the creaming time thereof.

9. An improvement in the manufacture of fondants grained in the dextrose phase, which comprises the step of dispersing in the fondant batch prior to the creaming thereof from about 0.01% to about 2.0% by weight of an edible, gum-like hydrophilic colloid, whereby the total creaming time of the batch is materially shortened.

10. That improvement in the manufacture of fondants grained in the dextrose phase, which comprises the step of dispersing in the fondant batch, prior to the creaming thereof, a minor proportion of gelatin, whereby the total creaming time of the batch is materially shortened.

11. That improvement in the manufacture of fondants grained in the dextrose phase, which comprises the step of dispersing in the fondant batch, prior to the creaming thereof, a minor proportion of agar, whereby the total creaming time of the batch is materially shortened.

12. That improvement in the manufacture of fondants which comprises the step of dispersing in the fondant batch, prior to the creaming thereof, a minor proportion of pectin, whereby the total creaming time of the batch is materially shortened.

13. That improvement in the manufacture of fondants grained in the dextrose phase, which comprises the step of dispersing in the fondant batch, prior to the creaming thereof, a minor proportion of pectin, whereby the total creaming time of the batch is materially shortened.

14. In the crystallization of sugars, the step of lessening the time required for crystallization, which comprises dispersing a minor proportion, less than about 2% by weight, of a hydrophilic colloid in the batch containing the sugar.

15. A method of lessening the time required for the crystallization of sugar and altering the nature of the crystal structure formed, which comprises the step of dispersing less than 2% by weight of an edible gum-like hydrophilic colloid in a batch containing the sugar prior to the crystallization thereof.

16. A process of lessening the time necessary for crystallization of sugars, which comprises the step of dispersing a minor proportion of pectin in a batch containing the sugar.

17. The improvement in the manufacture of fondants which comprises the addition of a minor proportion of edible gum-like hydrophilic colloids to a fondant batch, whereby the beginning of crystallization in the batch is hastened and the creaming time thereof is shortened.

18. A new and improved cooled and creamed fondant of the handroll cream type, characterized by a short and extremely smooth texture and containing about 80 parts of dextrose, about 20 parts of sugars including sucrose and invert sugar derived therefrom, about 0.4 to 1.0 part of pectin, and a proportion of water not greater than that present in this mixture when boiled under normal conditions, at about 230° F.

19. In a method of manufacturing fondants of the nature of handroll creams, which comprises the steps of dispersing 70 to 85 parts of dextrose and 15 to 30 parts of sucrose and about 0.05 to 2% of pectin by weight in an aqueous medium, cooking the batch to a temperature of from between 226° F. to 236° F., and then cooling and creaming the same.

20. A method of lessening the time required for the crystallization of sugar and altering the nature of the crystal structure formed, which comprises the step of dispersing less than 2% by weight of pectin in a batch containing the sugar, prior to the crystallization thereof.

ALBERT ADAMS LUND.

CERTIFICATE OF CORRECTION.

Patent No. 2,041,197.  May 19, 1936.

ALBERT ADAMS LUND.

It is hereby certified that error appears in the printed specification of the above numbered patent requiring correction as follows: Page 4, second column, line 20, for "0.2" read 0.2%; and that the said Letters Patent should be read with this correction therein that the same may conform to the record of the case in the Patent Office.

Signed and sealed this 11th day of August, A. D. 1936.

(Seal)

Henry Van Arsdale
Acting Commissioner of Patents.